Dec. 14, 1948.  O. H. SCHUCK  2,456,598
METHOD AND APPARATUS FOR MONITORING UNDERWATER
ECHO RANGE AND BEARING SYSTEMS
Filed Aug. 31, 1944
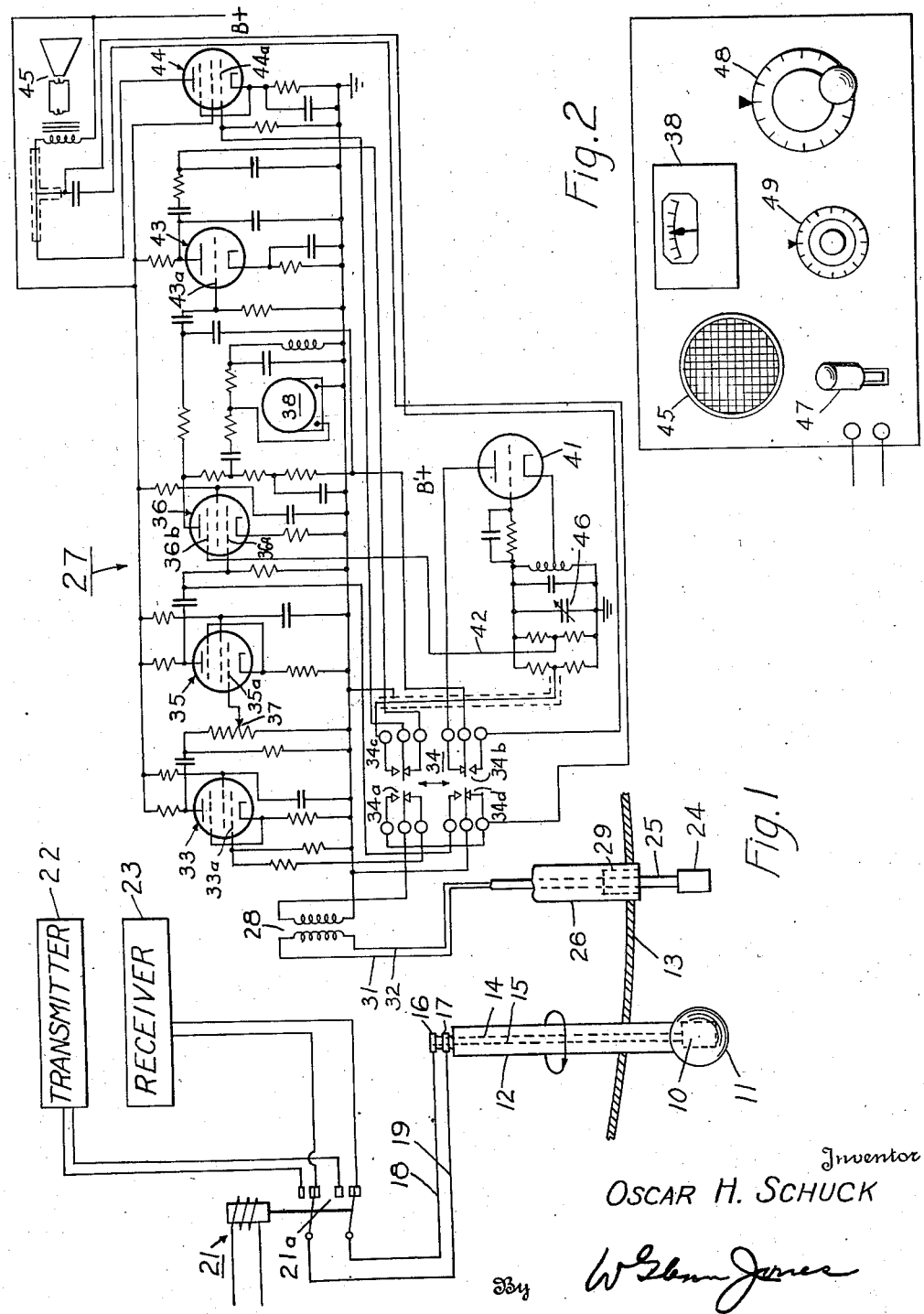
Inventor
OSCAR H. SCHUCK
By W. Glenn Jones
Attorney Patented Dec. 14, 1948

2,456,598

UNITED STATES PATENT OFFICE 2,456,598

METHOD AND APPARATUS FOR MONITORING UNDERWATER ECHO RANGE AND BEARING SYSTEMS

Oscar Hugo Schuck, Belmont, Mass., assignor to the United States of America as represented by the Secretary of the Navy Application August 31, 1944, Serial No. 552,058

4 Claims. (Cl. 177—386)

This invention relates to a method and apparatus for "monitoring" or adjusting and checking echo range and bearing systems used for obtaining the bearing and range of remotely positioned targets and, while particularly directed to systems of the character using compressional wave energy, may also be applied to systems using radiant or other energy.

In echo-ranging systems adapted for detecting the bearing and range of underwater targets such as a submarine, intermittent pulses or pings of compressional wave energy are projected from a transducer which is carried underwater by the searching vessel.

In one type of system the design characteristics of the transducer are such that the energy is projected therefrom in a relatively narrow, conical beam, the axis of the beam usually being substantially horizontal. The energy is usually at supersonic frequency although it may be otherwise and is commonly referred to in the art as "sound" even though it be above the normally audible range.

The transducer is mounted for rotation and the operator thus searches around the entire underwater horizon in steps of about 5° each for targets. At each step, the operator sends out an energy pulse and then waits for a certain length of time, which depends upon the range being searched, to ascertain whether or not an echo of the emitted energy pulse is obtained. If no echo is obtained, the transducer is turned slightly and the process repeated.

If the energy pulse should strike an underwater target such as a submarine, part of it is reflected or echoed back to the transducer, the latter now being connected to act as an energy receiver. The echoed wave energy pulse impinging upon the elements of the transducer generates electromotive forces therein and these latter are then put through a suitable electronic receiver to produce audible and/or visual indications to the operator. The operator by noting the bearing of the transducer at which an echo is received will know that a target lies somewhere along such bearing.

The speed of supersonic energy in water is substantially constant being about 1600 yards per second. Thus the range of the target may be computed from the time required by the energy pulse to travel from the transducer to the target and back again.

In order to achieve the best results in echo ranging equipment of the general class described, it is necessary that the signal produced by the returning echo be as strong as possible in comparison with all unwanted disturbances such as are produced by water background, water turbulence due to motion of the ship and transducer, thermal noise and vacuum tube noise. To realize this condition, it is, therefore, of course, necessary that the receiving system be accurately tuned to the frequency being emitted by the transmitting system. This is the only requirement provided the efficiency of the transmitting and receiving transducer or transducers is substantially independent of frequency over the operating range. This is not, however, the case with the commonly used equipments which use transducers that are mechanically sharply resonant. With such transducers, the efficiency falls off rapidly as the frequency of the emitted or received signal departs from the mechanical resonant frequency. That is to say, unless the transducer is operated at its mechanical resonant frequency, the strength of the emitted energy will be much below its maximum which means that the received echo will also be at a level below maximum.

For example, the transducer or projector currently used, known as the "QC" type has an active element consisting of a steel disk 15" in diameter and about an inch thick, to the back of which are attached a large number of thin nickel tubes. Through magnetostrictive action induced by current-carrying coils surrounding the nickel tubes, the disk and tube system is set into vibration at the frequency of the current in the coils. The face of the disk is in acoustic contact with the water and radiates compressional wave energy into the water. Maximum wave energy in the water is obtained when the amplitude of vibration of the disk-tube system is a maximum; that is, at the frequency of mechanical resonance. As a receiver, the sensitivity is greatest at this same frequency.

It is, therefore, obviously important that the current supplied to the transducer or projector be of the frequency of its mechanical resonance so that maximum compressional wave energy may be emitted, and so that the returning echo may have the frequency (except for Doppler effects) of maximum reception sensitivity. Unfortunately, however, the optimum, or mechanical resonant frequency, is not a constant value but varies with changes in operating conditions.

The mechanical resonant frequency of the transducer is determined by the elastic constants of the steel and nickel in the active elements. It is, therefore, to be expected that a change in temperature of the latter will cause changes in its resonant frequency. Factors affecting the temperature of the active elements are temperature of the water surrounding the transducer, magnitude of polarization current which is required to polarize the nickel tubes to obtain the magnetostrictive effect, power being used, length of time after commencing operation of the equipment, and duty cycle being used.

The factor capable of causing the greatest variation is the water temperature. Quite large changes therein, often as great as 40° F. can be experienced in going, for instance, from a cold current into a warm current. If the frequency of excitation of the transducer's magnetostrictive elements had been correct for resonance and, therefore, maximum operating efficiency at the cold water temperature, it would no longer be correct at the warm water temperature. For example, on some transducers, a variation of 40° F. in the operating temperature has produced a change in its resonant frequency as high as 400 cycles. Unfortunately, the sound operator will probably not be aware that a change has taken place in the water temperature and that his equipment is no longer functioning properly.

It is, therefore, the general object of this invention to provide a novel method of and monitoring apparatus by which the frequency of operation of underwater echo ranging equipment of the class described may be simply and quickly adjusted to the desirable end that such equipment may always be operated at its maximum efficiency.

The method comprises three steps in the following order:

1. Measuring the sound energy received from the transducer of the echo ranging equipment whereby the latter may be tuned to the frequency which gives maximum energy output.

2. Adjusting an oscillator in the monitoring apparatus to the frequency ascertained in step 1; and 3. Transmitting energy at such frequency to the receiving transducer of the echo ranging equipment from an auxiliary transducer associated with the monitoring equipment and adjusting the receiver portion of the main echo ranging equipment to that same frequency.

The monitoring apparatus comprises in general an auxiliary or monitor transducer which is adapted to be spaced a few feet from the main echo-ranging transducer. Energy picked up by the monitor transducer from the main transducer is fed into a combined receiver-transmitter apparatus which may be operated first as a receiver so that the main transducer may be adjusted to its optimum operating frequency. The transmitter portion of the apparatus is then adjusted to this frequency by beating it against the frequency of the incoming energy from the main transducer to zero beat. Energy at such frequency then sent out by the auxiliary transducer is picked up by the main transducer, now being connected to act as an energy receiver, and fed into the receiver of the main echo-ranging equipment, the receiver then being tuned for maximum response at such frequency.

By means of this method and the apparatus employed, the sound operator is thus able very quickly and simply to adjust the frequency of the transmitter oscillator of the main echo ranging equipment so that the main transducer will operate at its optimum frequency and likewise adjust the receiver portion of the equipment so that it will receive with maximum sensitivity at such frequency. At the same time the operator can measure the actual efficiency of his apparatus and compare it against the efficiency noted at the time of installation. This will gradually drop due to deteriorating components, but if the capabilities of the apparatus are known the operator can judge for himself the urgency of repairs.

A preferred embodiment of the invention is shown in the accompanying drawings in which Fig. 1 is a circuit diagram of the apparatus, and Fig. 2 is a front elevation of the control panel of the auxiliary monitoring apparatus utilized.

Referring now to the drawings, there is shown at 10 a transducer of the QC type described hereinabove which may be contained within a heavily constructed spherical housing 11, a portion of the wall of which is made of sound transparent material such as rubber or thin steel (not shown). This housing is supported at the lower end of a tubular casing 12 which projects through the bottom of a vessel's hull 13 and is adapted to be rotated so that the transducer 10 may, in operation of the echo-ranging equipment, be turned through 360°.

All of the coils surrounding the nickel tubes in transducer 10 may be internally connected and a pair of leads 14, 15 brought out to slip rings 16 and 17. Connections are then taken over conductors 18, 19 to contacts 21a of relay 21. For echo-ranging operation, the winding of relay 21 is energized at predetermined intervals and for a given period during which it is seen that the output of transmitter 22, usually at supersonic frequency, is connected through the relay contacts 21a to transducer 10 causing the latter to emit compressional wave energy into the surrounding water medium.

When relay 21 becomes de-energized, its contacts 21a open. Transmitter 22 is thereby disconnected from transducer 10 and receiver 23 is connected thereto. This places the receiver in readiness to receive electrical signals corresponding to the echo of the emitted energy pulse if reflected from an underwater target.

The foregoing apparatus which has been described is conventional and may be referred to as the main or principal apparatus.

The apparatus for performing the novel method of this invention may be referred to for convenience as the monitoring or auxiliary apparatus. It comprises a second transducer 24 which is positioned adjacent to the main transducer 10. Transducer 24 may be suspended over the side of the ship when it is desired to put it into use. Preferably, however, it is permanently installed adjacent the main transducer 10. It may thus be supported at the bottom of a vertically adjustable rod 25 which passes through a tubular housing 26, the latter being passed through the hull 13 and provided with a well 29 at its lower end into which the transducer 24 may be drawn up when not in use.

The design of transducer 24, which may also be of the magnetostrictive type, is preferably such that when its elements are energized, the pattern of the wave energy emitted will be substantially uniform in all directions in a horizontal plane. One such type of transducer is shown in application Serial No. 519,233 filed January 21, 1944, by Francis P. Bundy, Patent No. 2,431,026 granted November 18, 1947. Another is described in U. S. Patent No. 1,985,251 issued December 25, 1934, to Harvey C. Hayes.

Transducer 24 which may be referred to as the monitor transducer should be mounted near to the main transducer 10 and preferably at the same level. For satisfactory results with echo ranging transducers having an active face as large as 15" in diameter, such as the QC type, a distance of six feet between the two has been found satisfactory.

Monitor transducer 24 is connected to a combined receiver-transmitter unit 27. The receiver portion of this unit comprises an input transformer 28, the primary of which is connected to transducer 24 by conductors 31, 32. The secondary of this transformer is connected to control grid 33a of amplifier tube 33 via contacts 34a of a cam lever operated switch 34. Operation of the latter will be explained in further detail hereinafter.

The output of amplifier 33 is fed through two more stages of amplification comprising tubes 35 and 36; the latter also serving as a mixer. The degree of the total amplification is made adjustable by means of attenuator 37 which is connected between the output of tube 33 and the input to tube 35. The output of amplifier 36 is delivered to a meter 38.

The transmitter portion of the unit comprises an oscillator 41. When the latter is placed in operation through action of contacts 34b of switch 34, one function of its output is to combine with a signal incoming from transducer 24 to control grid 36a of tube 36. To do this, the output from oscillator 41 is fed over conductor 42 to a second control grid 36b of tube 36. The resultant beat note yielded by this arrangement is filtered to a grid 43a of another amplifier tube 43. The output from amplifier 43 is passed through contacts 34c of switch 34 to control grid 44a of still another amplifier tube 44. The output from amplifier 44 is then fed into a loudspeaker 45. The output frequency of oscillator 41 may be adjusted by tuning capacitor 46.

In Fig. 2, which represents a front elevation of the control panel of the combined receiver-transmitter unit 27, the front of speaker 45 is shown at the upper left; the lever for operating switch 34 is identified by reference numeral 47 and shown at the lower left; the face of meter 38 is at upper center; dial 48 at lower right is for tuning capacitor 46 of oscillator 41; and dial 49 at lower center is used for adjusting attenuator 37.

In Fig. 1, the contacts of switch 34 are shown at the circuit connections made when cam lever 47 is in its intermediate position. Lever 47 is pushed down when unit 27 is receiving energy signals emitted by transducer 10; it is placed in its intermediate position when adjusting the output frequency of oscillator 41 to the frequency of the incoming signal from transducer 10; and it is moved to its upper position when transmitting signals from transducer 24 back to transducer 10.

Operation

As explained above, the novel method for adjusting the output frequency from transducer 10 to its optimum value for the conditions encountered at any particular time comprises three steps, viz:

1. Measuring the sound energy received from the transducer of the echo-ranging equipment whereby the latter may be tuned to the frequency which gives maximum energy output;

2. Adjusting an oscillator in the monitoring apparatus to the frequency ascertained in step 1; and 3. Transmitting energy at such frequency to the receiving transducer of the echo-ranging equipment from an auxiliary transducer associated with the monitoring equipment and adjusting the receiver portion of the main echo-ranging equipment to that same frequency.

To perform step 1, relay 21 is held energized and transducer 10 thus delivers compressional wave energy into the water, being driven by transmitter 22 at a frequency set by the operator which might, for example, be the norm of its operating range.

Switch lever 47 is now moved to its down position, in which position, the top and middle contacts of contact set 34b in switch 34 are opened and the middle and bottom contacts of this set are similarly closed. All the other contacts in the remaining contact sets of switch 34 remain as shown in Fig. 1.

With switch lever 47 in its down position, the compressional wave energy emitted from transducer 10 is picked up by monitor transducer 24, which energy is then converted into corresponding electrical signals which feed over conductors 31, 32 into the primary of transformer 28. The corresponding signals produced in the secondary of transformer 28 are then applied through the middle and bottom contacts of contact set 34a in switch 34 to the grid 33a of amplifier 33. The output from amplifier 33 is applied through attenuator 37 to the grid 35a of the next adjacent amplifier 35. The output from amplifier 35 is applied to the grid 36a of amplifier 36 and the output therefrom is delivered to the meter 38.

The operator now turns transducer 10 until a maximum response is obtained in meter 38 which means that the transducer 10 is then facing directly toward transducer 24. With transducer 10 sending compressional wave energy into the water, the operator then adjusts attenuator 37 so that the reading of the energy meter 38 is slightly to the left of the center of the scale. The operator now adjusts the output frequency of transmitter 22 so as to make the reading in meter 38 a maximum. Thus transmitter 22 is tuned to the mechanical resonant frequency of transducer 10, which as previously described is the optimum frequency for transmitting and receiving.

To now perform step 2, switch lever 47 is shifted from its downmost position to its intermediate position, which puts all of the contacts in its various contact sets in the relation shown in Fig. 1. The change, as compared with having switch lever 47 down, is to open the middle and bottom contacts of contact set 34b in switch 34 and close the middle and top contacts of this set. With these connections, a D. C. plate potential from a source marked B'+ is applied through the middle and top contacts of contact set 34b in switch 34 to the plate of oscillator 41 to thereby initiate its output, the latter being applied over conductor 42 to grid 36b of tube 36. Tube 36 is also at this time receiving signals over grid 36a corresponding to the compressional wave energy being picked up by transducer 24 from transducer 10 and put through amplifiers 33 and 35.

It is thus seen that tube 36 gets one signal at the output frequency of transducer 10 and a second signal at the output frequency of oscillator 41. The result is that a beat note is yielded from tube 36 which is filtered to the grid 43a of amplifier 43. The output from amplifier 43 is then applied to the grid 44a of amplifier 44 via the bottom and middle contacts of contact set 34c in switch 34 thereby producing sound in the loud speaker 45 at the frequency of the aforesaid beat note. The output frequency from oscillator 41 is then adjusted by turning dial 48 (which adjusts capacitor 46) until the note comes practically to zero beat; that is, until the indicator needle of meter 38 is made to oscillate as slowly as possible or not at all. At this stage, the needle of the meter indicates the beats, and the significance of this to the operator is that oscillator 41 is now tuned practically to the same frequency as the signal which is being emitted by the main transducer 10.

To perform step 3, switch lever 47 is moved to its uppermost position which continues the closure of the middle and top contacts of contact set 34b in switch 34 and now closes the middle and top contact members of contact sets 34a, 34c and 34d. Oscillator 41 will now deliver its output at the adjusted frequency through transformer 28 and via conductors 31 and 32 to transducer 24 and, accordingly, compressional wave energy at that frequency is projected into the water by transducer 24. This energy is received by the main transducer 10 which, in the particular embodiment being described, now has been disconnected from the transmitter 22 and connected to receiver 23 by de-energizing the winding of relay 21. Receiver 23 is then tuned so as to give a maximum response in the visual and/or aural indicating apparatus which is a part of the conventional equipment comprising receiver unit 23.

Recapitulating, the overall result of the foregoing three steps is that first, by adjusting the frequency of the transmitter 22, the main transducer 10 has been set to operate at its mechanical resonant frequency for the particular operating conditions encountered, which frequency is that at which the transducer emits maximum sound energy in the water. By the aid of the monitoring apparatus 27, oscillator 41 has been adjusted to that frequency and has sent wave energy of that frequency back to the main transducer 10, such energy being fed into the main receiver unit 23 which has thereupon been adjusted for optimum receiving effect of energy at such frequency.

The rapidity with which a complete tuning procedure may be carried out is decidedly favorable. Tests show that this can be done in less than twenty seconds. An ordinary seaman can be trained to perform the necessary operations in the sound room, thereby allowing the sound operator to remain at his post and interrupting the normal sound search for only a very short time.

In conclusion, I desire it to be understood that while the foregoing embodiment which has been described is to be preferred, various changes therein may occur to those skilled in the art without departing from the spirit and scope of the invention as defined in the appended claims.

It should be further understood that the invention is applicable to other forms of echo range and bearing systems. For example, in the embodiment described, the main transducer is used both for sending energy and receiving its echo but it is evident that the invention may likewise be used in systems utilizing separate transducers for sending and receiving energy.

After thus fully describing my invention, I claim:

1. The method of bringing wave energy transmitter and receiver units alternatively connected to a transducer to an optimum frequency for transmitting energy therefrom and receiving energy at said optimum frequency which consists of the steps of measuring at a selected position in space with reference to the transducer the intensity of the wave energy emitted by said transducer, adjusting the transmission frequency of said transmitter unit until said measured energy is a maximum, transmitting energy at said adjusted frequency from an auxiliary source for reception by said transducer and the receiver unit, and tuning said receiver unit until the energy received by it is a maximum.

2. Monitoring apparatus for establishing the optimum frequency of operation of echo range and bearing equipment, the latter including main transmitter and receiver units and main transducer means, said apparatus comprising an auxiliary transducer spaced from said main transducer means, an auxiliary receiver connected to said auxiliary transducer for receiving signals corresponding to wave energy emitted by said main transducer means, a signal strength indicator in the output of said auxiliary receiver, an auxiliary transmitter, and switch means for selectively connecting the output from said auxiliary transmitter to an input of said auxiliary receiver and to said auxiliary transducer.

3. Monitoring apparatus for establishing the optimum frequency of operation of echo range and bearing equipment, the latter including main transmitter oscillator and receiver units and main transducer means, said apparatus comprising an auxiliary transducer spaced from said main transducer means, an auxiliary receiver connected to said auxiliary transducer for receiving signals corresponding to wave energy emitted from said main transducer means, and said receiver including a mixer stage, a signal strength indicator in the output of said auxiliary receiver, an auxiliary transmitter oscillator, and switch means for selectively connecting the output from said auxiliary oscillator into said receiver mixer stage and to said auxiliary transducer.

4. The method of bringing wave energy transmitter and receiver units provided with radiation emitting and responsive means to an optimum frequency for transmitting energy therefrom and receiving energy at said optimum frequency which consists of the steps of measuring at a selected position in space with reference to said means the intensity of the wave energy emitted by said means, adjusting the transmission frequency of said transmitter unit until said measured energy is a maximum, transmitting energy at said adjusted frequency from an auxiliary source for reception by said means and said receiver unit, and tuning said receiver unit until the energy received by it is a maximum.

OSCAR HUGO SCHUCK.

REFERENCES CITED

The following references are of record in the file of this patent:

UNITED STATES PATENTS

| Number | Name | Date |
|---|---|---|
| 1,321,197 | Fay | Nov. 11, 1919 |
| 1,518,123 | Lawther | Dec. 2, 1924 |
| 2,308,390 | Ritzmann | Jan. 12, 1943 |
| 2,355,826 | Sharpe | Aug. 15, 1944 |
| 2,363,583 | Gilman | Nov. 28, 1944 |
| 2,405,814 | Brannin | Aug. 13, 1946 |
| 2,421,016 | Deloraine et al. | May 27, 1947 |

FOREIGN PATENTS

| Number | Country | Date |
|---|---|---|
| 3,934 | Great Britain | Jan. 15, 1914 |
| 297,998 | Germany | Apr. 1, 1921 |